(No Model.)
P. McDONALD.
THILL SUPPORT FOR VEHICLES.
No. 497,284. Patented May 9, 1893.
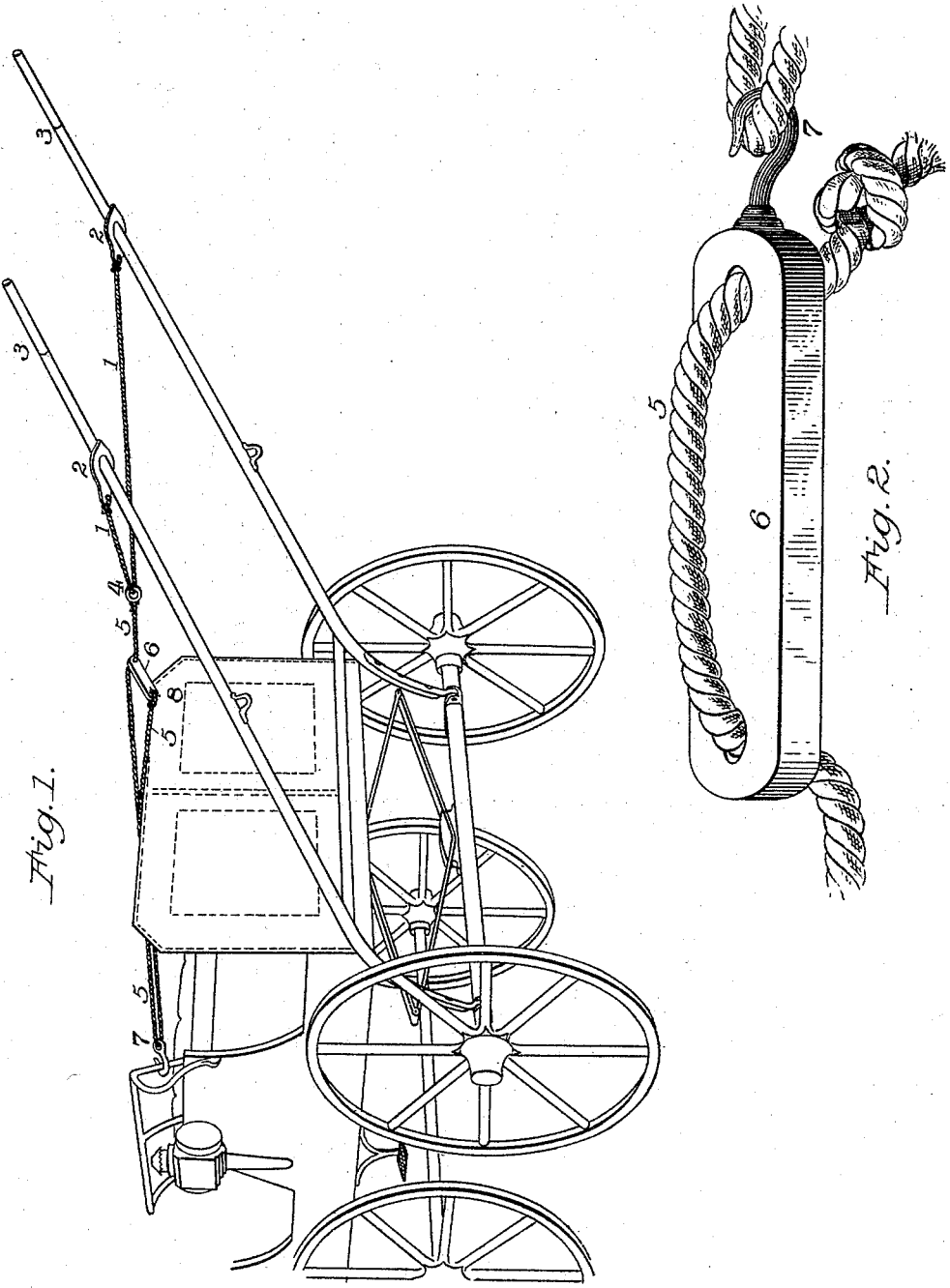
Attest:
Howell Bartle.
Alex Scott
Inventor:
Patrick McDonald
By Philip F. Larner
Associate attorney

UNITED STATES PATENT OFFICE.

PATRICK McDONALD, OF BROOKLINE, MASSACHUSETTS.

THILL-SUPPORT FOR VEHICLES.

SPECIFICATION forming part of Letters Patent No. 497,284, dated May 9, 1893.

Application filed October 12, 1892. Serial No. 448,716. (No model.)

*To all whom it may concern:*

Be it known that I, PATRICK MCDONALD, of Brookline, in the county of Norfolk and State of Massachusetts, have invented a new and useful Improvement in Devices for Supporting Vehicles, &c., of which the following is a specification.

My invention relates to devices for holding up the shafts of vehicles, and it consists in certain new and useful combinations and constructions of the several parts thereof, substantially as hereinafter described and claimed.

In the drawings: Figure 1 is a perspective view of a vehicle with its shafts in position in which they are held up by my improved device. Fig. 2 is a modification of a portion of the binder and hook for lengthening and shortening the holding strap.

1 is a cord having attached to its ends the leather or rubber sleeves, 2, 2, which slip over the ends of the shafts, 3, 3. These sleeves may be made of thick sole leather and the cord fastened to them in any suitable manner, and they should be made to hug the shafts when slipped far enough upon them. On the cord, 1, is the ring, 4, which slips or adjusts itself to any suitable position and has the cord, 5, attached to it. The cord, 5, passes through a hole in one end of the block, 6, and thence through the eye of the hook, 7, and then back to the other end of the block, 6, where it is attached to the same by the knot, 8. By this means the strain on the knot, 8, causes the block 6 to bind at any desired point on the cord, 5, so that the block may be slipped along on the cord and when released it will lock itself into position. The hook 7 is made fast to the iron work of the vehicle by simply hooking it into a convenient part, as for instance the rail of the seat. It will be noticed that the adjustability of the ring, 4, on the cord 1 and the adjustability of the length of the cord, 5, are important factors in rendering this shaft supporter universally applicable to all sizes and shapes of carriage shafts and to various portions of the iron-work of different carriages, into which it may be convenient to hook the hook 7. The height of the shafts can also be adjusted in the most convenient manner possible by the slipping of the block 6 on the cord 5.

In Fig. 2 is shown a modification of the adjustment of block 6. In this case the hook, 7, is attached directly to the end of the block and the cord, 5, passes through two holes in the ends of the block closely enough so that when the cord is drawn to any particular position through the holes any strain on the hook will cause the cord to bind itself in that position.

What I claim as new and of my invention is—

1. The combination of the elastic sleeves, 2, 2, arranged to fit the shafts, their connecting cord, 1, the ring, 4, adjustably attached upon the cord, the hook, 7, and the cord, 5, arranged to connect the ring and the hook, and provided with apparatus to adjust its length, substantially as described.

2. The combination of the sleeves, 2, 2, and their connecting cord, 1, the ring, 4, adjustably attached to the same, the hook, 7, and the cord 5 arranged to connect the ring and the hook by passing through the eye of the latter, and the block 6 having one end sliding on the cord 5 and the other end attached to the end of said cord, substantially as described.

PATRICK McDONALD.

Witnesses:
   LEPINE HALL RICE,
   DAVID HALL RICE.